April 30, 1963  E. R. BRANDT  3,087,400
FOLDING CAMERA

Filed Sept. 8, 1960  4 Sheets-Sheet 1

INVENTOR.
Edison R. Brandt
BY Brown and Mikulka
ATTORNEYS

April 30, 1963 E. R. BRANDT 3,087,400
FOLDING CAMERA

Filed Sept. 8, 1960 4 Sheets-Sheet 3

INVENTOR.
Edison R. Brandt
BY
Brown and Mikulka
ATTORNEYS

April 30, 1963 E. R. BRANDT 3,087,400
FOLDING CAMERA

Filed Sept. 8, 1960 4 Sheets-Sheet 4

INVENTOR.
Edison R. Brandt
BY
Brown and Mikulka
ATTORNEYS

United States Patent Office 3,087,400
Patented Apr. 30, 1963

1

3,087,400
FOLDING CAMERA
Edison R. Brandt, Marblehead, Mass., assignor to Polaroid Corporation, Cambridge, Mass., a corporation of Delaware
Filed Sept. 8, 1960, Ser. No. 54,715
8 Claims. (Cl. 95—40)

This invention relates to photography and more specifically to the construction of folding cameras of the hinged-base type. In such cameras, the base, or camera bed, is hinged to a camera body and is movable between open and closed positions with respect to said body.

It is the normal practice in the construction of folding cameras to provide means for erecting and holding the camera bed in a predetermined fixed relationship to the camera body, and means for rigidly locking the lens support in registration with the focal plane of the camera. Such means are usually in the form of arms, struts or links which are mechanically locked when the camera is in the operating position and must be unlocked in some manner by the operator before the camera may be closed. Typical unlocking means require the operator to use both hands in applying force to supporting members on each side of the camera, while somehow folding the camera body and bed together without the use of his hands.

Accordingly, it is an object of this invention to provide a new and improved folding camera construction in which the camera bed is quickly and conveniently opened and closed.

It is another object of this invention to provide a folding camera having locking means which rigidly fix the position of the camera bed and lens support when the camera is in the open position and which unlock automatically when the lens is retracted within the camera body.

A further object is to provide a folding camera, movable between open and closed positions, with novel and simplified means for mechanically locking the camera in the open position.

Still another object is to provide novel means for rigidly holding the lens support in fixed registration to the focal plane of a folding camera in which said means are extremely small and compact and contained entirely within and upon the slide which carries the lens support.

A still further object is to provide a system of focusing the objective lens of the camera through the movement of a movable carriage, the lens support being mounted on the carriage and the carriage on the camera bed in such a way that the camera may be closed without regard to the position of the carriage relative to the camera bed.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

2

Figure 1:
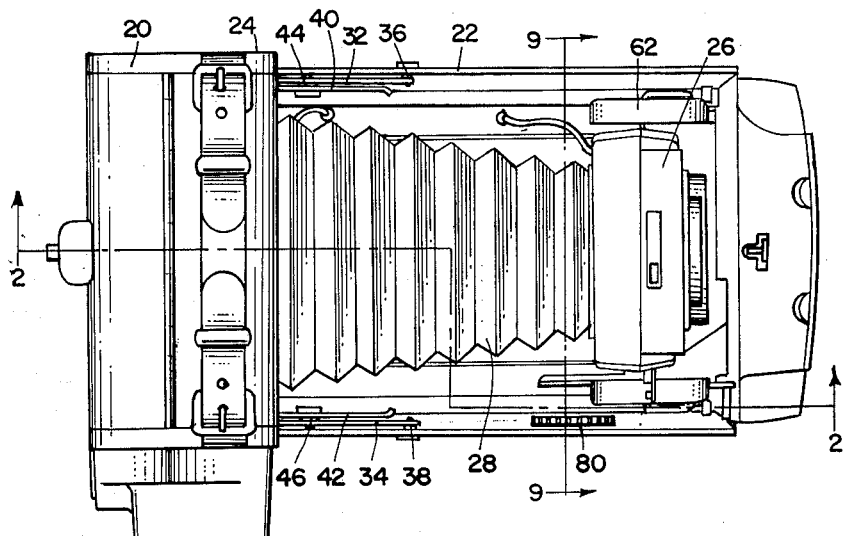
FIGURE 1 is a top view of a camera embodying the subject invention, shown in the fully open position.
Figure 3:
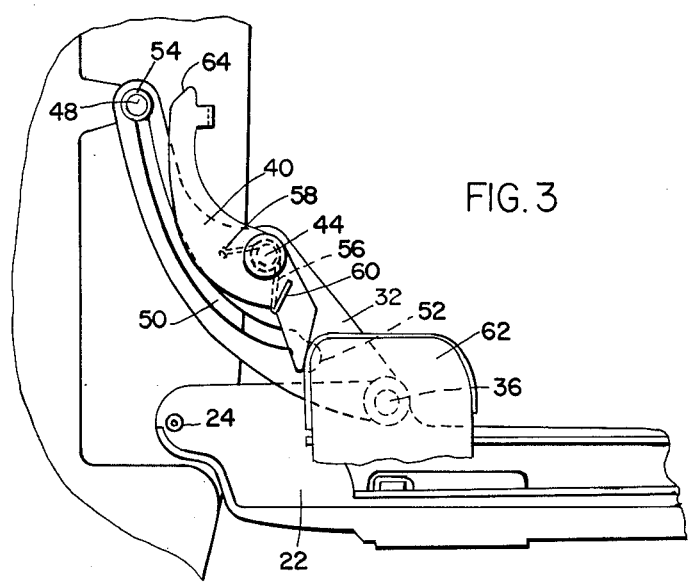
FIG. 3 is a fragmentary view of a portion of FIG. 2, illustrating the position of the camera bed erecting links when the lens support is retracted.
Figure 4:
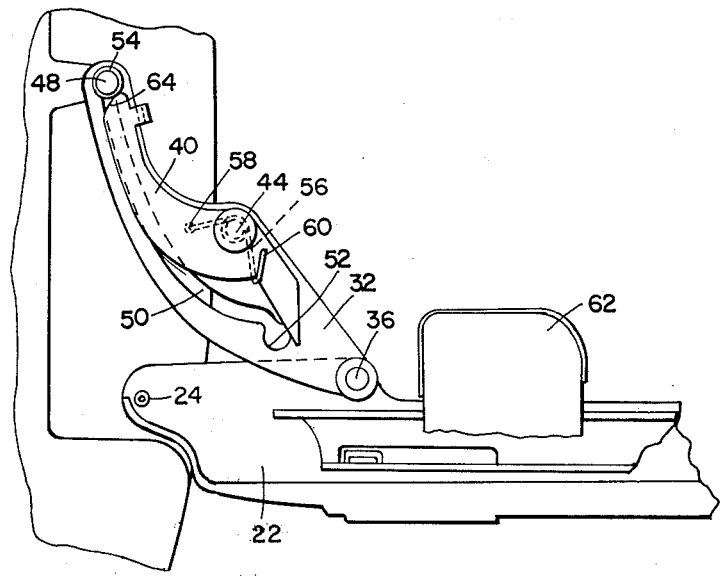
Figure 8:
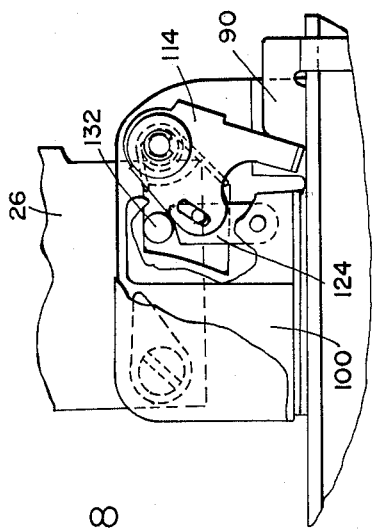
Figure 5:
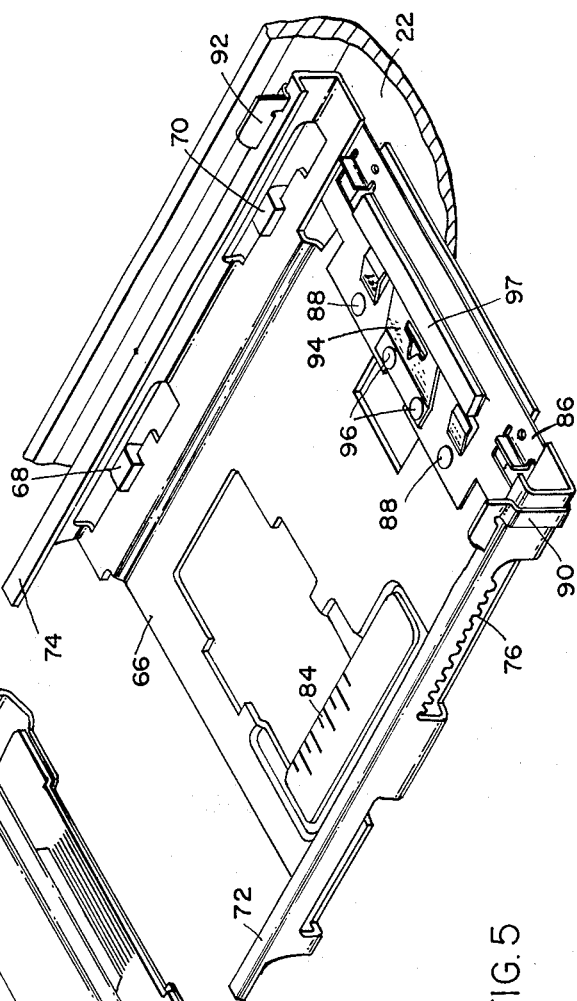
Figure 7:
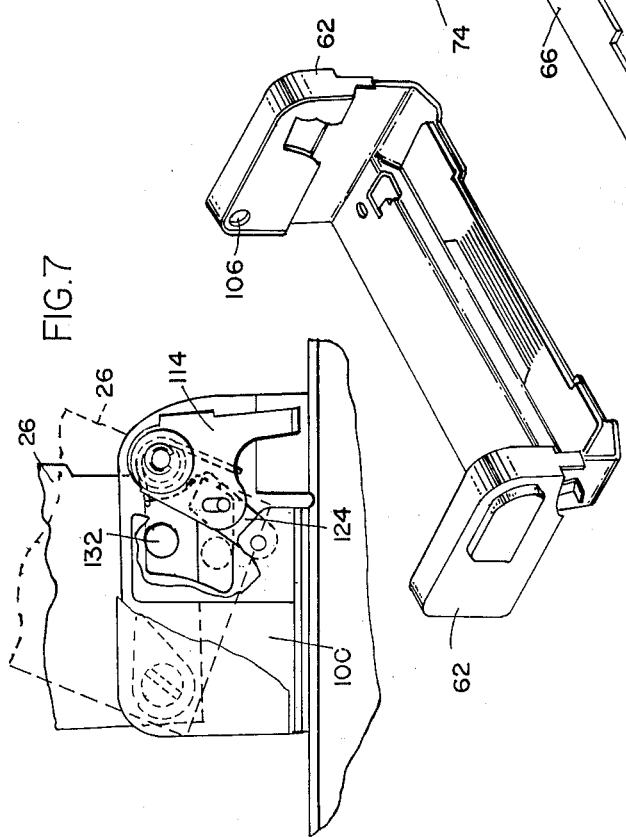
Figure 6:
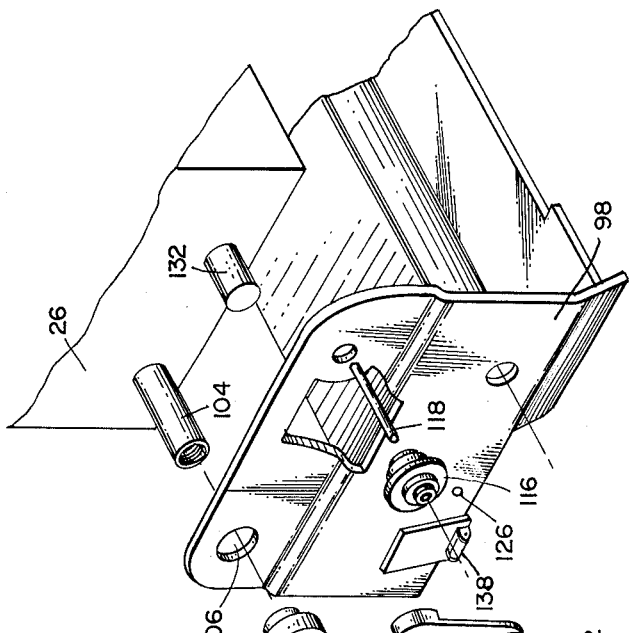
Figure 9:
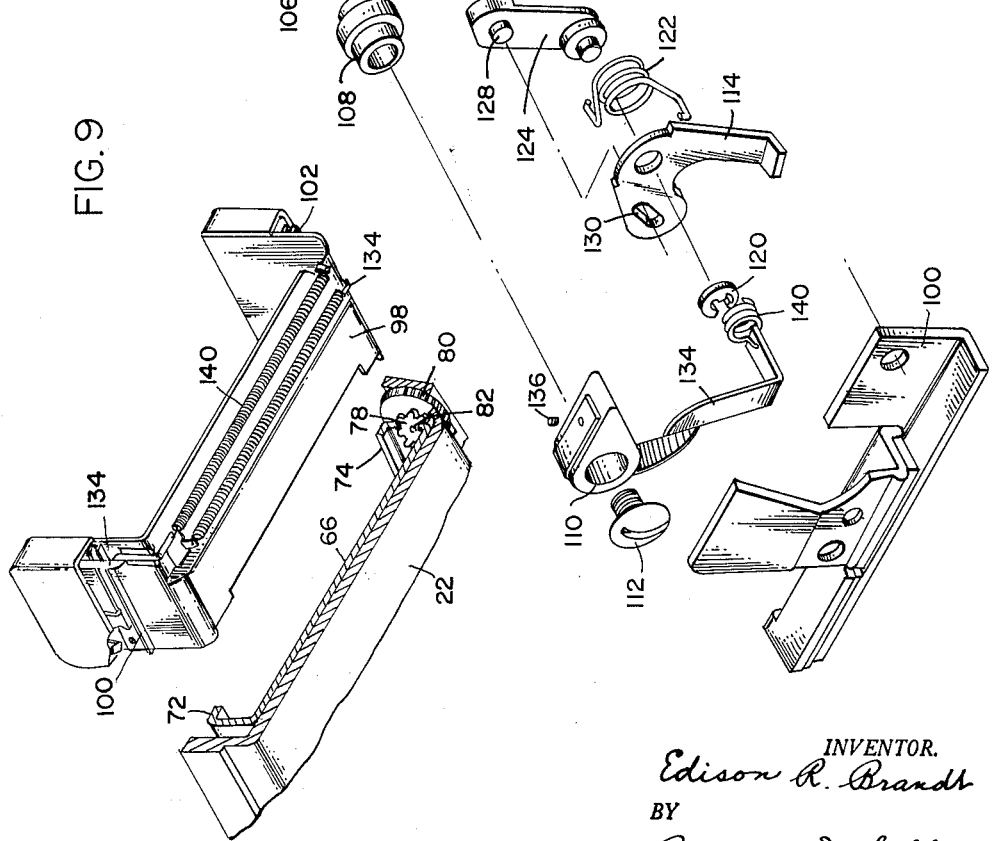

FIG. 4 is the same view as FIG. 3, illustrating the position of the camera bed erecting links as the lens support is protracted;

FIG. 5 is a perspective exploded view of the lens support slide and the movable carriage on which the slide is movably mounted, showing the latch for engaging the lens support slide and also showing a fragment of the camera bed;

FIG. 6 is an exploded perspective view of the parts making up the lens support erecting mechanism, showing fragments of the lens support and lens support slide;

FIG. 7 is a side view, partly in section, of the lens support erecting mechanism, illustrating the position of the parts in the unlocked position, the dotted portion showing the manner in which the lens support may be tipped;

FIG. 8 is the same view as FIG. 7, illustrating the position of the parts in the locked position when the lens support slide is in engagement on the movable carriage; and FIG. 9 is a perspective view in vertical section as taken along line 9—9 of FIG. 1, also showing another view of the lens support slide.

Figure 2:
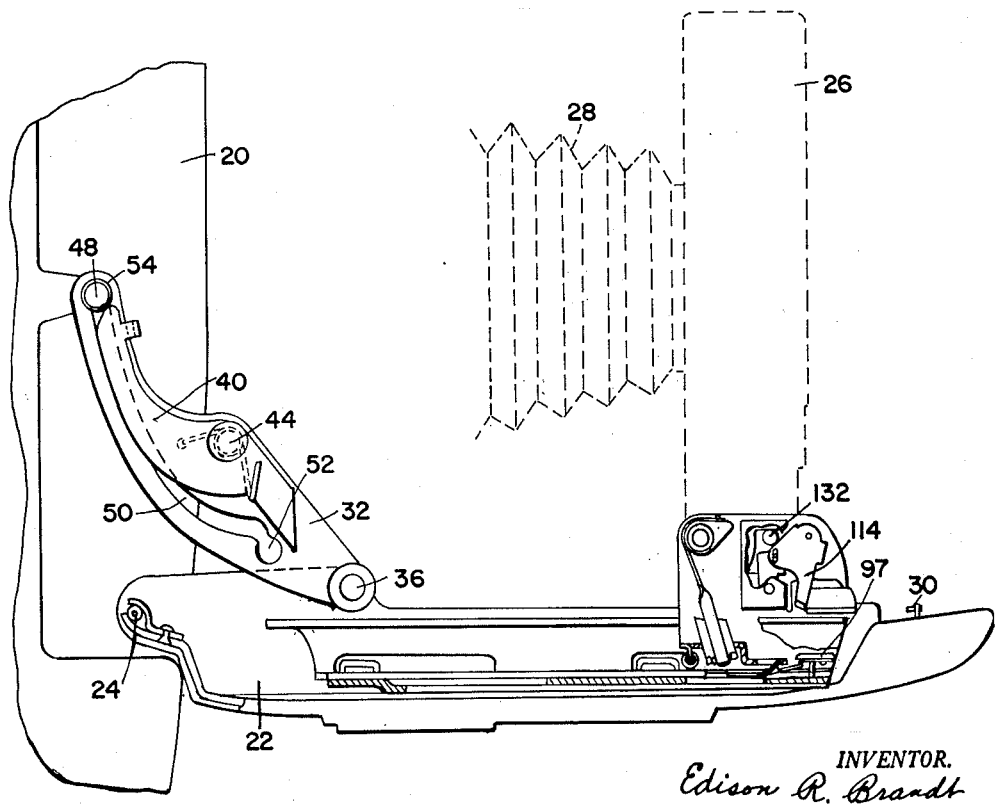
FIG. 2 is a fragmentary enlarged view, in vertical section, as taken along the line 2—2 of FIG. 1, with some parts removed.

In the form of the invention illustrated in the accompanying drawings, it is shown as a part of the well-known Polaroid Land camera, as exemplified in U.S. Patents Nos. 2,435,717 and 2,455,111, but is not intended to be restricted solely to cameras of this type. Thus, the camera comprises a camera body 20 with a camera bed 22 hingedly attached thereto at 24. For the purposes of this disclosure the camera body and bed may be of any suitable design and hinged together by conventional means, well known to those skilled in the art. The camera bed 22 turns about hinge 24 in moving to and from the open and closed positions with respect to the camera body 20. A lens support 26, which in this example also houses the shutter mechanism (not shown), is operatively connected to the camera body 20 by means of an extensible bellows 28. A suitable releasable latch 30 is provided for holding the camera body 20 and camera bed 22 together when the camera is in the closed position. When in the open position, as in FIGS. 1 and 2, the camera bed 22 extends substantially perpendicularly from the camera body 20. It is prevented from opening further by outer links 32 and 34 which are pivotally attached at one end 36 and 38 to the camera bed 22. Inner links 40 and 42 are pivotally connected at 44 and 46 to the outer links 32 and 34. The pivotal connections 44 and 46 are near the mid-points of inner links 40 and 42, leaving these links free to move at both ends when rotated about their respective pivotal connections.

In the interest of clarity and brevity the operation of the camera bed erection links just described will be explained for one side of the camera only, it being understood that the structure and operation is duplicated on the other side. Fixed stud 48 within the camera body 20 rides in guide slot 50 within the outer link 32. When the camera is in the closed position, the fixed stud 48 is near the lower end 52 of guide slot 50; and when the camera is in the open position, the upper end 54 of guide slot 50 rests against fixed stud 48. A positive stop is thus provided by outer link 32 for the opening of the camera bed 22.

A spring 56 is mounted by passing one of its ends through a hole 58 in outer link 32 at a point above pivotal connection 44 and its other end 60 under inner link 40 at a point below pivotal connection 44, the coiled portion of spring 56 passing around pivotal connection 44. Thus the pressure of spring 56 tends to rotate inner link 40 about pivotal connection 44 in a counterclockwise direction as viewed in FIGURES 3 and 4. The lower end of inner link 40 is contacted by the surface of lens erection mechanism cover 62 when the lens support 26 is in the retracted position, as in FIG. 3. This holds the lower portion of inner link 40 rearward and the upper portion forward against the pressure of spring 56. As the lens support 26 is moved to the operating or protracted position the pressure of spring 56 rotates inner link 40 about pivotal connection 44 until the upper surface 64 comes to rest against the bottom of fixed stud 48, as in FIG. 4. Surface 64 is a low rise cam surface constructed and arranged in such a manner that inward pressure on camera bed 22 will not cause the cam to override stud 48, nor will there by any back-lash between links 32 and 40.

When in this position the camera bed 22 is opened to a position substantially perpendicular to the camera body 20 and locked securely in this position by means of outer link 32, which prevents further outward movement, and inner link 40 which prevents inward movement. When the lens support 26 is retracted to the rear of the camera bed 22 in preparation for closing the camera, the movement of cover 62 causes inner link 40 to turn about pivotal connection 44 in a clockwise direction. The upper portion of inner link 40 moves forward and returns to the position of FIG. 3. Upper surface 64 of inner link 40 no longer rests against the bottom of fixed stud 48 and the camera is free to close. All that is required is for the operator to push the camera body 20 and camera bed 22 together, without the necessity of manually unlocking the erection linkage.

A movable carriage 66 is sideably mounted on camera bed 22 by means of four slotted guides, integral to and symmetrically arranged, two on each side, on the camera bed 22. Two of these guides, 68 and 70, may be seen on the portion of camera bed 22 shown in FIG. 5, the other two being in corresponding positions on the opposite side of the same surface of camera bed 22. The sides of movable carriage 66 are flanged to form tracks 72 and 74. A portion of track 72 is notched to form a rack 76 which is engaged by pinion 78, as seen in FIG. 9. Movement of movable carriage 66 is accomplished by turning knurled knob 80 which is connected to pinion 78 and turnably mounted on camera bed 22 by pin 82. A suitable scale 84, inscribed with indicia indicating the focus position of the objective lens, is also provided on movable carriage 66. A plate 86 is secured by rivets 88 to movable carriage 66, the ends 90 and 92 of plate 86 extending under and around tracks 72 and 74. A latch 94, in the form of a leaf spring, is secured to plate 86 by rivets 96. The forward edge of latch 94 is extended to form a flat bar 97 which causes depression of latch 94 when pressed.

Then lens support 26 is pivotally mounted on either side upon a U-shaped slide 98. Side members 100 and 102 of slide 98 are formed to provide grooves for engagement with tracks 72 and 74, as seen in FIG. 9. The mechanism by which lens support 26 is mounted on slide 98 and held erect when in the operating position is illustrated in FIGS. 6, 7 and 8. This structure is duplicated on each side of lens support 26 and again the description is abbreviated to apply to one side only. All parts numbered 104 through 140, inclusive, are duplicated in the structure.

As best seen in FIG. 6, fixed post 104 on lens support 26 is supported in hole 106 of slide 98 by bushing 108. Also mounted on bushing 108 is member 110, secured by screw 112 which engages internal threads in post 104. Lever 114 is pivotally mounted on slide 98 by means of bushing 116 and pin 118. Retaining ring 120 secures one end and pin 118 is upset behind slide 98 to secure the other end. Spring 122 has its coiled portion around bushing 116, one end is fixed in slide 98 and the other bears against lever 114 tending to rotate it in a counterclockwise direction as viewed in FIGS. 6, 7 and 8. Link 124 is pivotally mounted in hole 126 of slide 98. Stud 128 on link 124 passes through slot 130 in lever 114.

When slide 98 is in any position on movable carriage 66 other than fully extended, the parts described in the preceding paragraph are in the position illustrated in FIG. 7. Then lens support 26 is free to tip forward, being pivotally mounted upon slide 66 by post 104 and not supported at any other point. Stud 132 on lens support 26 extends through an opening in slide 98 and serves as a stop to prevent backward movement from the vertical. Metal strip 134 is secured by pin 136 to the upper surface of member 110. After being bent 90° in the vertical place and 90° in the horizontal, metal strip 134 passes around roller 138 and is attached to spring 140. As seen in FIG. 9, spring 140 passes laterally across the camera between slide 98 and movable carriage 66 and is attached at its other end to slide 98. Forward tipping of lens support 26, as in the dotted portion of FIG. 7, causes rotation of post 104 and member 110 which carries metal strip 134 with it, the movement of metal strip 134 around roller 138 putting spring 140 in tension. When lens support 26 is released the spring pressure causes counter-rotation of member 110 and post 104, through metal strip 134, returning lens support 26 to the vertical.

When lens support 26 is protracted to the forward end of movable carriage 66 the horizontal portion of slide 98 rides over latch 94 and is engaged thereby. At this time, end 90 of plate 86 contacts lever 114 and holds it stationary as slide 98 continues to advance into engagement with latch 94. This results in clockwise rotation of lever 114 about its pivotal mounting on slide 98. The sides of slot 130 bear on stud 128 causing counterclockwise rotation of link 124 about its pivotal mounting on slide 98. The parts are moved to the position of FIG. 8 and the top of link 124 provides support under stud 132 on lens support 26. Thus, lens support 26 is locked rigidly, preferably in registration to the focal plane of the camera, being supported on post 104 and under stud 132 by link 124, slide 98 being in fixed engagement on movable carriage 66 by latch 94.

When latch 94 is removed from engagement with slide 98 by pressing bar 97, lens support 26 may be retracted along tracks 72 and 74. As lever 114 moves out of contact with end 90, spring 122 causes counterclockwise rotation of lever 114 as viewed in FIGS. 7 and 8. The sides of slot 130 again bear on stud 128 causing clockwise rotation of link 124 about its pivotal mounting. This movement returns the parts to their position of FIG. 7 and again lens support 26 is free to tip forward.

With the lens support 26 retracted to the rear of the camera bed 22 the camera may be moved to the closed position. The lens support 26 remains in the same position relative to the camera body 20 as the camera bed 22 is folded about hinge 24. The slide 98 pivots about the lens support mountings, rotating with the camera bed 22. In the retracted position, the slide 98 is in contact with the rear of the camera bed 22 which serves as a stop. The movable carriage 66 may be at any position relative to the camera bed 22 without affecting the retracted position of slide 98, and since there are no struts or other supporting members between the lens support 26 and the movable carriage 66 or the camera bed 22, the camera may be closed without regard to the position of movable carriage 66 on camera bed 22.

Means are thus provided for mechanically locking the camera bed relative to the body when in the open position and the lens support in registration to the focal plane when in the operating position. These means require no manual unlocking by the operator when moving the camera to the closed position, but are locked and unlocked through contact with surfaces on the camera provided for this purpose, resulting in significant advantages in ease of handling and camera construction.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A folding camera comprising a body, a camera bed hingedly attached to said body and movable between open and closed positions with respect thereto, a lens support operatively connected to said body and movable between retracted and protracted positions upon said bed, a first member supporting said bed in said open position, a second member movable independently of said first member between an operative position, wherein said second member cooperates with said first member to lock said bed in said open position, and an inoperative position, wherein said bed may be moved to said closed position, and first means forming a part of said lens support cooperating with said second member to effect movement thereof to said operative position when said lens support is moved to said protracted position and to effect movement of said second member to said inoperative position as said lens support is returned to said retracted position.

2. A folding camera as defined in claim 1 wherein a portion of said body is engaged between said first and second members when said second member is in said operative position.

3. A folding camera as defined in claim 2 wherein said lens support is pivotally mounted on a slide which is linearly movable between retracted and protracted positions on said camera bed, second means are pivotally mounted on said slide for movement between an inoperative position, wherein said lens support may be moved about its pivotal mounting, and an operative position, wherein said lens support is locked in a rigid position, and a fixed portion of said camera bed is constructed and arranged to cause pivotal movement of said second means to said operative position as said slide is linearly moved to said protracted position.

4. A folding camera as defined in claim 3 wherein said first means comprises a member constructed and arranged to enclose said second means.

5. A folding camera comprising a body, a camera bed hingedly attached to said body and movable between open and closed positions with respect thereto, a lens support operatively connected to said body and linearly movable between retracted and protracted positions upon said bed when in said open position, a first member supporting said bed in said open position, a second member pivotally movable between an operative position, wherein said second member cooperates with said first member to lock said bed in said open position, and an inoperative position, wherein said bed may be moved to said closed position, and means forming a part of said lens support cooperating with said second member to effect pivotal movement thereof to said operative position when said lens support is linearly moved toward said protracted position and to effect pivotal movement of said second member to said inoperative position as said lens support is linearly moved to said retracted position.

6. A folding camera as defined in claim 5 wherein said second member is pivotally mounted on said first member and said second member is biased toward said operative position.

7. A folding camera as defined in claim 6 wherein a portion of said camera body is engaged between said first and second members when said second member is in said operative position.

8. A folding camera comprising a body, a camera bed hingedly attached to said body and movable between open and closed positions with respect thereto, a lens support operatively connected to said body and linearly movable between retracted and protracted positions upon said bed, a first link pivotally attached at one end to said camera bed and slidably connected at its other end to a fixed portion of said body, a second link pivotally connected at a centrally disposed point to said first link and biased about its pivotal connection toward an operative position wherein said fixed portion of said body is engaged between one end of said second member and said other end of said first member, whereby said camera bed is locked in said open position, and third means on said lens support constructed and arranged to contact the other end of said second member when said lens support is in said retracted position, linear movement of said lens support away from said retracted position allowing said bias to cause pivotal movement of said second member to said operative position and linear movement of said lens support toward said retracted position causing said third means to contact said other end of said second member and pivotally move said second member against said bias out of said operative position, whereby said camera bed is no longer locked in said open position.

References Cited in the file of this patent

FOREIGN PATENTS 617,539    Germany _____ Aug. 21, 1935